United States Patent
Connolly (10) Patent No.: US 9,025,750 B1
(45) Date of Patent: May 5, 2015

(54) METHOD AND APPARATUS FOR DETERMINING AND UTILIZING LOCAL PHONE TOPOGRAPHY

(75) Inventor: Stephen Connolly, Swords (IE)

(73) Assignee: Avaya Inc., Basking Ridge, NJ (US)

( * ) Notice: Subject to any disclaimer, the term of this patent is extended or adjusted under 35 U.S.C. 154(b) by 1992 days.

(21) Appl. No.: 11/941,572

(22) Filed: Nov. 16, 2007

(51) Int. Cl.
*H04M 3/42* (2006.01)
*H04M 3/56* (2006.01)
*H04L 12/16* (2006.01)
*H04Q 11/00* (2006.01)

(52) U.S. Cl.
CPC ..................................... *H04M 3/56* (2013.01)

(58) Field of Classification Search
CPC ....... H04M 3/56; H04M 3/568; H04M 3/002; H04M 3/2227; H04M 3/567; H04M 3/562; H04M 9/082; H04M 11/00; H04M 15/8072; H04M 15/863; H04M 2203/5018; H04M 3/34
USPC ............. 379/202.01, 203.01, 204.01, 205.01, 379/206.01, 388.06, 406; 348/14.01, 14.02, 348/14.08, 14.1; 455/416, 456, 404.2; 370/260, 351, 352, 353, 354, 355, 356, 370/357, 261, 262; 709/204, 205, 206, 207
See application file for complete search history.

(56) References Cited

U.S. PATENT DOCUMENTS

| | | | |
|---|---|---|---|
| 6,125,115 A * | 9/2000 | Smits | 370/389 |
| 6,304,648 B1 * | 10/2001 | Chang | 379/202.01 |
| 6,888,925 B2 * | 5/2005 | Spitzer et al. | 379/15.01 |
| 7,006,618 B1 * | 2/2006 | Shaffer et al. | 379/215.01 |
| 7,099,448 B1 * | 8/2006 | Laniepce et al. | 379/202.01 |
| 7,738,643 B1 * | 6/2010 | Garrison et al. | 379/203.01 |
| 8,126,129 B1 * | 2/2012 | McGuire | 379/202.01 |
| 8,442,197 B1 * | 5/2013 | Mazza et al. | 379/202.01 |
| 2002/0111173 A1 * | 8/2002 | Hendrey et al. | 455/456 |
| 2003/0073927 A1 * | 4/2003 | Johansen et al. | 600/559 |
| 2004/0101119 A1 * | 5/2004 | Malcolm et al. | 379/202.01 |
| 2004/0213402 A1 * | 10/2004 | Ruetschi | 379/388.06 |
| 2005/0135583 A1 * | 6/2005 | Kardos | 379/142.01 |
| 2005/0213731 A1 * | 9/2005 | Rodman et al. | 379/202.01 |
| 2005/0286443 A1 * | 12/2005 | McMillen et al. | 370/260 |
| 2006/0132595 A1 * | 6/2006 | Kenoyer et al. | 348/14.08 |
| 2006/0133619 A1 * | 6/2006 | Curry et al. | 381/26 |
| 2006/0230106 A1 * | 10/2006 | McDonald, Jr. | 709/204 |
| 2006/0256738 A1 * | 11/2006 | Kenoyer et al. | 370/260 |
| 2007/0050451 A1 * | 3/2007 | Caspi et al. | 709/204 |
| 2007/0091831 A1 * | 4/2007 | Croy et al. | 370/260 |
| 2007/0121865 A1 * | 5/2007 | Jachner | 379/201.01 |

(Continued)

*Primary Examiner* — Fan Tsang
*Assistant Examiner* — Kharye Pope
(74) *Attorney, Agent, or Firm* — Anderson Gorecki & Rouille LLP (57) ABSTRACT

A method, apparatus and computer program product for determining and utilizing local phone topography is presented. A first signal level for each of a plurality of telephone lines is determined, each of the telephone lines having a telephone of a plurality of telephones associated therewith. A new signal is initiated on another telephone line with an additional telephone. Next, a change in signal level is determined for each of the plurality of telephone lines and, based on the change in signal level for each of the plurality of telephone lines, a determination made regarding which telephones of the plurality of telephones are within a listening distance (also referred to herein as earshot) of the additional telephone. A topography is defined for the telephones and the additional telephone based on the determining which telephones are within a listening distance of the additional telephone.

16 Claims, 9 Drawing Sheets

(56) References Cited

U.S. PATENT DOCUMENTS

| | | |
|---|---|---|
| 2007/0291108 A1* | 12/2007 | Huber et al. ............... 348/14.02 |
| 2007/0291667 A1* | 12/2007 | Huber et al. .................. 370/260 |
| 2008/0159503 A1* | 7/2008 | Helbling et al. ......... 379/142.17 |
| 2008/0214205 A1* | 9/2008 | Alles et al. ................. 455/456.1 |
| 2009/0051756 A1* | 2/2009 | Trachtenberg et al. .... 348/14.08 |

\* cited by examiner

METHOD AND APPARATUS FOR DETERMINING AND UTILIZING LOCAL PHONE TOPOGRAPHY

BACKGROUND

Over the past several years many organizations have implemented open plan offices, also referred to as cubicles or simply cubes. One reason for this is the belief that an open environment enables better communication that leads to innovation and more satisfied customers. Companies can cut occupancy costs by squeezing more people into less space in open plans. Many companies want to motivate employees to work together by moving into collaborative, team-oriented environments. An open plan can help address problems related to isolation and storing of information. Networked information exchange is a logical outcome when people engage their colleagues in corridor and workspace conversations.

With energy conservation a concern, there is an explosion of interest in sustainable building design. Fewer private offices means fewer walls, simpler air handling systems, and less construction waste and materials. An open plan creates opportunities to bring daylight into the interior, reducing lighting and cooling loads.

Open plan offices can have a high density of phones. When multiple people in the same office are on the same call, there is opportunity for echo due to the sound traveling both within the office and over the conference call. When people are sufficiently close or talk with sufficient volume, their speech can be picked up by the microphones of other callers introducing additional echo.

SUMMARY

Conventional mechanisms such as those explained above suffer from a variety of deficiencies. One such deficiency is that conventional echo cancellation is aimed at reducing or eliminating echo at one single phone. Conventional conferencing bridges have modes whereby the loudest talker is the only talker that is transmitted over the conference call, however this can introduce problems when people need to interrupt the loudest talker (and they cannot achieve sufficient volume) or where one caller is in an environment with high levels of background noise.

For participants of conference calls in an open plan office, echo generation is a problem. One solution employed by open plan office workers is to mute their lines when they are not talking, however this can lead to problems where they forget to un-mute their lines to start talking again, or where they forget that they are on mute.

Traditional solutions involve configuring the conference bridge to limit accepting calls from a particular range of phone numbers, or limiting the number of out-going lines to a specific number (i.e. the conference bridge). One problem with this solution is keeping the information up to date. Phone numbers are no longer tied to specific locations, and there is no guarantee that the callers are dialing into the same conference call.

When a company needs to provide an ad-hoc unscheduled all-hands meeting, it may not be possible to obtain a meeting room having sufficient capacity for all employees. AS such, a conference call may be used to provide information to the large number of employees. However, while the open plan offices used by the employees must be large, feedback and echo make it very difficult to have contributions from anyone in such an environment. Placing all the phones on mute does not solve the difficulty of asking a question from such an ad-hoc conference, as one phone taken off mute will pick up the other speakerphones and give rise to feedback.

People from the same building or open plan office may dial into the same conference call from separate phone lines, either generating unnecessary cost for their employers, or putting a potentially unnecessary load on the conference bridge. Some companies want to minimize the number of lines used in conference calls. Additionally, when a conference bridge is running short on resources, resources could be recovered if people who were in the same building used a single phone line and not multiple phone lines.

Embodiments of the invention significantly overcome such deficiencies and provide mechanisms and techniques that provide a method of determining and utilizing a telephone system topography. A first signal level for each of at least one of a plurality of telephone lines is determined, each of the plurality of telephone lines having a telephone of a plurality of telephones associated therewith. A new signal is initiated on another telephone line with an additional telephone. Next, a change in signal level is determined for each of the at least one of a plurality of telephone lines and, based on the change in signal level for each of the at least one of a plurality of telephone lines, and a determination made regarding which telephones of the plurality of telephones are within a listening distance (also referred to herein as earshot) of the additional telephone. A topography is defined for the plurality of telephones and the additional telephone based on the determining which telephones of the plurality of telephones are within a listening distance of the additional telephone.

Another particular embodiment provides a method of enhancing call quality of a conference call. A determination is made regarding which telephones of a plurality of telephones are within a listening distance to each other. The telephones are then grouped based on the determining which telephones of a plurality of telephones are within a listening distance to each other and a predetermined setting is applied to at least one telephone of the group.

In another particular embodiment, a method of grouping conference call participants is performed. A determination is made regarding which telephones of a plurality of telephones are within a listening distance to each other. The telephones are grouped based on the determining which telephones of a plurality of telephones are within a listening distance to each other. A user of the at least one telephone of the group is directed to disconnect from the conference call and share a telephone line with at least one other telephone of the group.

In still another particular embodiment, a method of enhancing call quality of a conference call is preformed. A determination is made regarding which telephones of a plurality of telephones are within a listening distance to each other. The telephones are then grouped based on the determining which telephones of a plurality of telephones are within a listening distance to each other. Audio from the telephones is ignored when a similar volume level is shown among the telephones of the group. An occurrence of increased audio from a telephone within the group is determined and other telephones within the group are placed on dynamic local hold.

Other embodiments include a computer readable medium having computer readable code thereon for providing mechanisms and techniques that provide a method of determining and utilizing a telephone system topography. The computer readable medium includes instructions wherein a first signal level for each of at least one of a plurality of telephone lines is determined, each of the plurality of telephone lines having a telephone of a plurality of telephones associated therewith.

The computer readable medium includes instructions wherein a new signal is initiated on another telephone line with an additional telephone. Further, the computer readable medium includes instructions wherein a change in signal level is determined for each of the at least one of a plurality of telephone lines and, based on the change in signal level for each of the at least one of a plurality of telephone lines, and a determination made regarding which telephones of the plurality of telephones are within a listening distance of the additional telephone. The computer readable medium includes instructions wherein a topography is defined for the plurality of telephones and the additional telephone based on the determining which telephones of the plurality of telephones are within a listening distance of the additional telephone.

Another particular embodiment includes a computer readable medium having computer readable code thereon for providing a method of enhancing call quality of a conference call. The computer readable medium includes instructions wherein a determination is made regarding which telephones of a plurality of telephones are within a listening distance to each other. The computer readable medium includes instructions wherein the telephones are then grouped based on the determining which telephones of a plurality of telephones are within a listening distance to each other and a predetermined setting is applied to at least one telephone of the group.

In another particular embodiment, a computer readable medium having computer readable code thereon for grouping conference call participants is performed. The computer readable medium includes instructions wherein a determination is made regarding which telephones of a plurality of telephones are within a listening distance to each other. The computer readable medium includes instructions wherein the telephones are grouped based on the determining which telephones of a plurality of telephones are within a listening distance to each other. The computer readable medium includes instructions wherein a user of the at least one telephone of the group is directed to disconnect from the conference call and share a telephone line with at least one other telephone of the group.

In still another particular embodiment, include a computer readable medium having computer readable code thereon for enhancing call quality of a conference call is provided. The computer readable medium includes instructions wherein a determination is made regarding which telephones of a plurality of telephones are within a listening distance to each other. The computer readable medium includes instructions wherein the telephones are then grouped based on the determining which telephones of a plurality of telephones are within a listening distance to each other. The computer readable medium includes instructions wherein audio from the telephones is ignored when a similar volume level is shown among the telephones of the group. The computer readable medium includes instructions wherein an occurrence of increased audio from a telephone within the group is determined and other telephones within the group are placed on dynamic local hold.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process determines and utilizes local phone topography as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations which determines and utilizes local phone topography as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
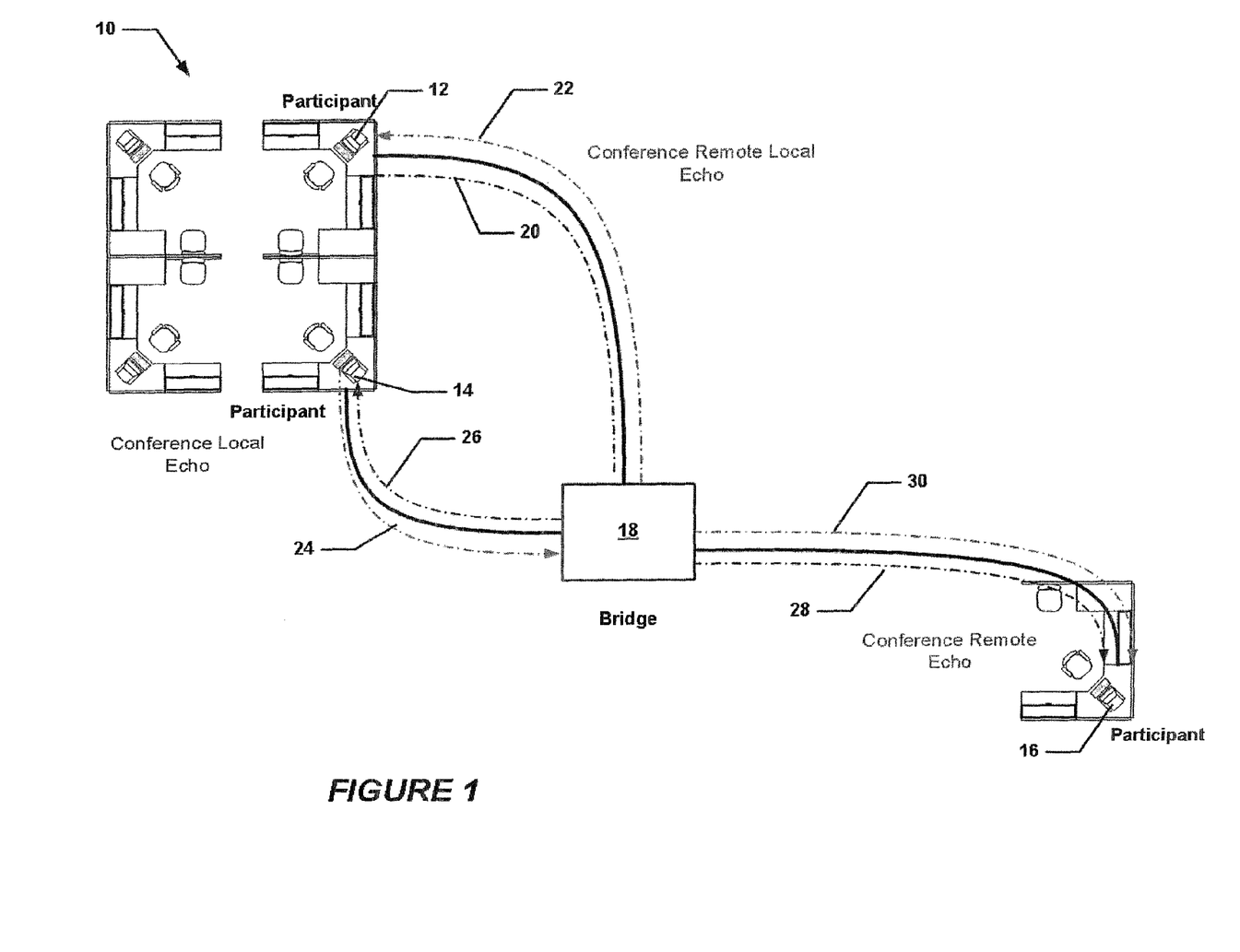
FIG. 1 depicts an open-office environment wherein different types of echo can occur.

Referring now to FIG. 1, an open plan office environment 10 is shown. The open plan office environment 10 includes participant 12, participant 14 and participant 16. Also shown is a conference call bridge 18, responsible for providing conference call capabilities to the conference call participants 12, 14 and 16. For example, in a call involving participants 12, 14 and 16, bridge 18 provides the proper mix to the proper participants. Bridge 18 receives audio from participant 12 and provides audio from participant 14 and participant 16 to participant 12. Similarly, bridge 18 receives audio from participant 14 and provides audio from participant 12 and participant 16 to participant 14, while also receiving audio from participant 16 and providing audio from participant 12 and participant 14 to participant 16. Thus each conference member hears audio from other conference members, but not from themselves.

With this type of open plan office environment 10 different types of echo can occur. One type of echo is referred to as conference local echo. This type of echo occurs when a first participant hears a second participant as part of the conference call but also hears the second participant thorough real space, due to the second participant being with a listening distance (earshot) of the first participant. As an example, participant 14 is the first participant, and participant 12 is the second participant. When participant 12 speaks, his voice signal is transported to the bridge 18 via signal path 20. This results in the bridge 18 forwarding participant 12 voice signal to both participant 14 via path 26 and to participant 16 via path 28. Since participant 14 is within a listening distance of participant 12, participant 14 also hears participant 12 through real space, resulting in participant 14 experiencing conference local echo, since participant 14 hears participant 12 twice (once through the conference call and once through real space).

Another type of echo is known as conference remote local echo. This occurs within the same environment described above, except that now participant 14's microphone picks up the audio from participant 12 through real space and transmits this audio to the bridge 18 via path 24. Bridge 18 then provides this audio signal to both participant 12 over path 22 and to participant 16 via path 30. Participant 12 hears his own voice and the same audio from the bridge 18. Participant 12 is experiencing conference remote local echo.

A third type of echo is referred to as conference remote echo and occurs as described above with the addition that participant 16 hears the audio from participant 12 and also hears the same audio from participant 14 which has picked up participants 12 audio. Participant 16 is experiencing conference remote echo since he hears the audio spoken by participant 12 from participant 12's phone and also from participant 14's phone.

In order to provide conference calls and reduce or eliminate the occurrence of one or more of these types of echo in an open plan office environment, it is desirable to first determine a topology of phones in the open plan office. Once the phone topography is determined, different steps can be taken to enhance conference call quality and experience by making use of local phone topographic information (i.e. when it is known which phones are within ear-shot of each other). The topography may include grouping of phones that are within a listening distance to each other. A phone may belong to one or more groups.

One method for determining local phone topography takes place when one or more phones are being installed on site. The switch can enter a special mode whereby it instructs all installed phones to listen for a short period of time (e.g., 100 ms) to determine background noise level and report back the level of background noise. Once the level of all installed phones has been determined, a newly installed phone is instructed to ring, and the background noise level of all the other phone lines is monitored. This process can be repeated with increasing ring volume to identify phones that are within earshot of each other's microphones. When the switch is passing a call through to a conference bridge, it can transfer details of any other lines that are nearby and also connected to that conference bridge.

Another method for determining local phone topography takes place when a participant enters a conference call. Typically, when a participant enters a conference call, the conference bridge can be configured to ask the participant to speak their name. The conference bridge records their name and then uses the recording to inform the other participants that "NAME" has entered the conference. While the caller is recording the person's name, they are not connected to the conference call, thus if the recording of their name matches the sound coming from any of the existing conference lines (within a small time delay window), then those lines are within ear-shot (as there is no other way for that sound to arrive). While this is a processing-intensive, the processing need only be performed when a participant is entering the conference, and only if the volume on the other lines exceeds a configurable threshold.

Yet another method for determining local phone topography involves the conference bridge keeping track of the volume of all of the lines in each conference call (in order to determine which participant is the loudest talker). A time-based correlation of volume increases across all conference lines will reveal lines that are within earshot. The type of correlation function would not be computationally expensive as it need only use integer arithmetic and consider average line volumes for short intervals (e.g. between 10 and 100 ms) and for a total of at most 1-2 seconds. This method has the advantage of being able to dynamically determine volume and would cover use-cases where one participant was on a cellular or Digital Enhanced Cordless Telecommunications (DECT) phone and moved near another caller (to e.g., show a document under discussion).

Making use of local phone topographic information can enhance conference call quality and experience. One method for enhancing call quality is by providing a local dynamic lecture mode (where one phone of the group is on speaker and the rest of the phones of the group are on hold) to phones that are within earshot. That is, phones that are within earshot of each other are placed into groups. A phone may belong to more than one group (e.g. a first phone may be within earshot of a second phone but not a third phone, while the second phone might be within earshot of both the first phone and the second phone).

The conference bridge would enforce the rule that at most one phone line in each group may be off mute (i.e., if all the phone lines are sufficiently quiet, then none of them would contribute to the conference mix, if multiple lines in a group are above a configurable threshold, then only the loudest line would contribute to the conference mix). As the lines are all within earshot, if somebody needs to interrupt and the current talker is detected by the conference bridge as being louder (may depend on microphone gain settings in the phone or other line issues), they can merely speak to them through the office. In this respect, the automatic muting of lines should not cause undue problems.

Another method for enhancing conference call quality and experience by making use of local phone topographic information is obtained by providing different local mixes to phones that are within earshot. When phones are sufficiently close, an adjacent talkers speech may actually be competing with their speech transmitted over the conference call. This can be an unnecessary distraction. When the bridge has sufficient free resources, it could provide an alternative mix to phones that are determined to be very close to each other. This alternative mix would include all lines not in the local group and rely on the local groups audio being picked up by virtue of being local.

Another method for enhancing conference call quality and experience by making use of local phone topographic information is achieved by applying dynamic local hold to phones that are within earshot. Again when phones are sufficiently close, the local group could be placed on hold while one of the phones in the local group is the active talker. The disadvantage with this technique is that the phones in the local group will be unable to hear the non-local lines if they are trying to interrupt. The advantage is that it would not require as many resources on the bridge as other techniques.

Local phone topographic information is also useful for determining callers that can share a single line. They are probably already causing a significant disturbance to their neighbors (that are not in the conference call) as they conduct a distributed conversation, and thus switching to a single speakerphone may be preferable. Additionally, if some participants are on a cellular or DECT phone, they may not be aware that there are participants in their immediate locality on the call.

One way of achieving this occurs when callers enter a conference and it is determined that they are in the same local group, they can be automatically placed into a sub-conference, played an automated message (e.g., "Company policy mandates that you must share a single line . . . ") until only one line remains.

Another way of achieving this is when a caller enters a conference and it is determined that there is already a participant in their local group, they are played an automated message (e.g., "Caller ABC is already in the call, please use their phone line") and the caller attempting to enter the conference is disconnected from the call.

Still another way of enhancing conference call quality and experience occurs when a caller enters a conference using the moderator code. The moderator can automatically eject any participants who are in their local group with a message telling them to share the moderator's line.

Yet another manner for enhancing conference call quality and experience takes place when the conferencing bridge is running low on resources. The conference bridge can place callers in the same local group into a sub-conference, play an automated message (e.g., "The bridge is running low on resources, please decide who's phone line to share and hang up all the other lines to be returned to the conference").

Phones which are in the same topography and are all on speaker phone, should show a consistent volume pattern, i.e. when the conference sources speech external from the local group, all phones should, a short period of time later, show an echo of that speech (from the neighboring speakerphones) at a reduced volume. While this pattern is maintained, the conference can safely ignore the sounds coming from these speakerphones. If, however, the pattern is broken and one phone shows a higher increase in volume, then somebody is trying to talk on the conference from that speakerphone. All the speaker phones which show sufficient volume echo can then be placed on dynamic local hold, thereby allowing the talker to speak without feedback or echo (that can be picked up). Those people farther away, but still in the same open plan office will continue to hear the conference mix (thus providing PA like functions) while those close by will hear the talker directly.

Figure 2:
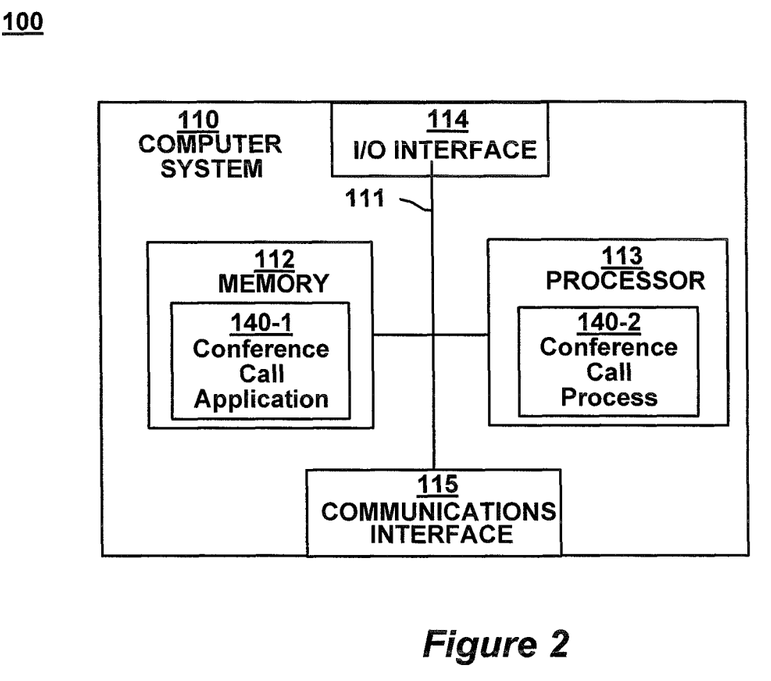
FIG. 2 illustrates an example computer system architecture for a computer system that determines and utilizes local phone topography in accordance with embodiments of the invention.

FIG. 2 is a block diagram illustrating an example computer system 100 (e.g., conference bridge 18 as shown in FIG. 1) for implementing conference call function 140 and/or other related processes to carry out the different functionality as described herein.

As shown, computer system 100 of the present example includes an interconnect 111 that couples a memory system 112 and a processor 113 an input/output interface 114, and a communications interface 115.

As shown, memory system 112 is encoded with conference call application 140-1. Conference call application 140-1 can be embodied as software code such as data and/or logic instructions (e.g., code stored in the memory or on another computer readable medium such as a disk) that support functionality according to different embodiments described herein.

During operation, processor 113 of computer system 100 accesses memory system 112 via the interconnect 111 in order to launch, run, execute, interpret or otherwise perform the logic instructions of the conference call application 140-1. Execution of conference call application 140-1 produces processing functionality in conference call process 140-2. In other words, the conference call process 140-2 represents one or more portions of the conference call application 140-1 (or the entire application) performing within or upon the processor 113 in the computer system 100.

It should be noted that, in addition to the conference call process 140-2, embodiments herein include the conference call application 140-1 itself (i.e., the un-executed or non-performing logic instructions and/or data). The conference call application 140-1 can be stored on a computer readable medium such as a floppy disk, hard disk, or optical medium. The conference call application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of conference call application 140-1 in processor 113 as the conference call process 140-2. Those skilled in the art will understand that the computer system 100 can include other processes and/or software and hardware components, such as an operating system that controls allocation and use of hardware resources associated with the computer system 100.

Flow charts of the presently disclosed methods are depicted in FIGS. 3 through 9. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
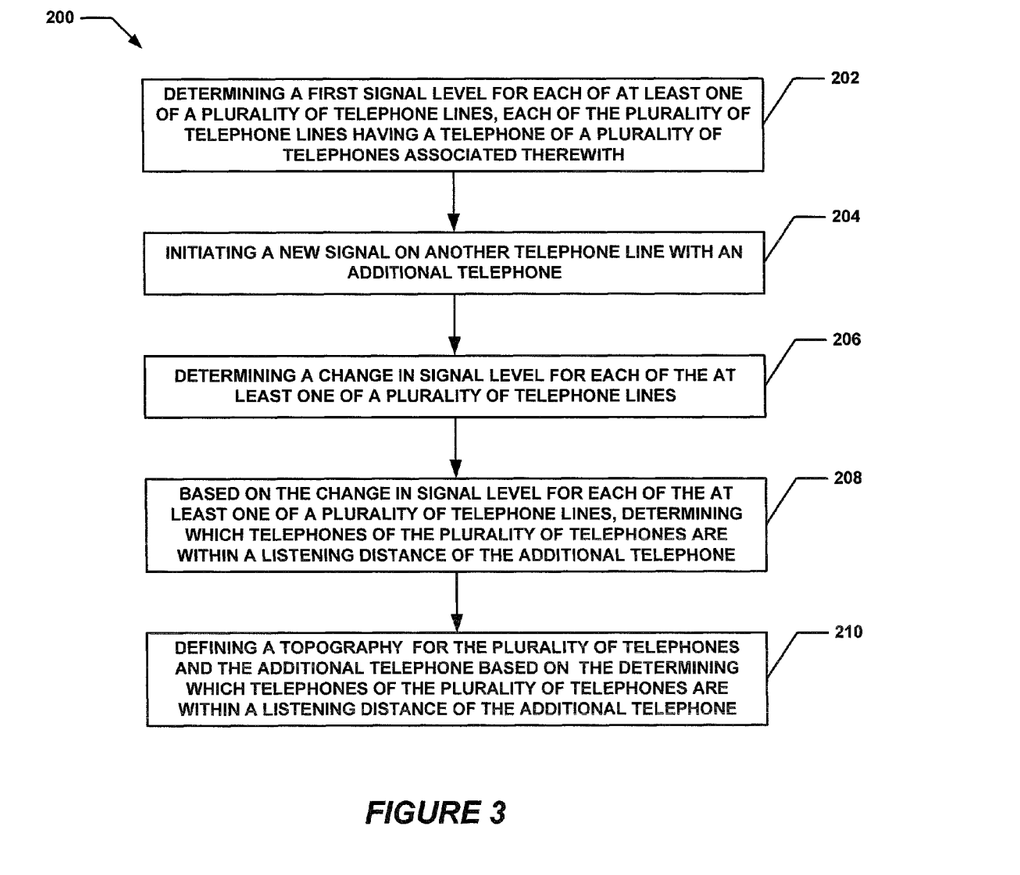
FIG. 3 comprises a flow diagram of a particular embodiment of a method for determining local phone topography in accordance with embodiments of the invention.

Referring now to FIG. 3, a flow diagram of a particular embodiment of a method 200 for determining local phone topography in accordance with embodiments of the invention is shown. The method 200 begins with processing block 202 which recites determining a first signal level for each of at least one of a plurality of telephone lines, each of the plurality of telephone lines having a telephone of a plurality of telephones associated therewith.

Processing block 204 discloses initiating a new signal on another telephone line with an additional telephone. Processing block 206 states determining a change in signal level for each of the at least one of a plurality of telephone lines.

Processing continues with processing block 208 which recites based on the change in signal level for each of the at least one of a plurality of telephone lines, determining which telephones of the plurality of telephones are within a listening distance of the additional telephone.

Processing block 210 discloses defining a topography for the plurality of telephones and the additional telephone based on the determining which telephones of the plurality of telephones are within a listening distance of the additional telephone. The topography may include grouping of phones that are within a listening distance to each other. A phone may belong to one or more groups.

Figure 4:
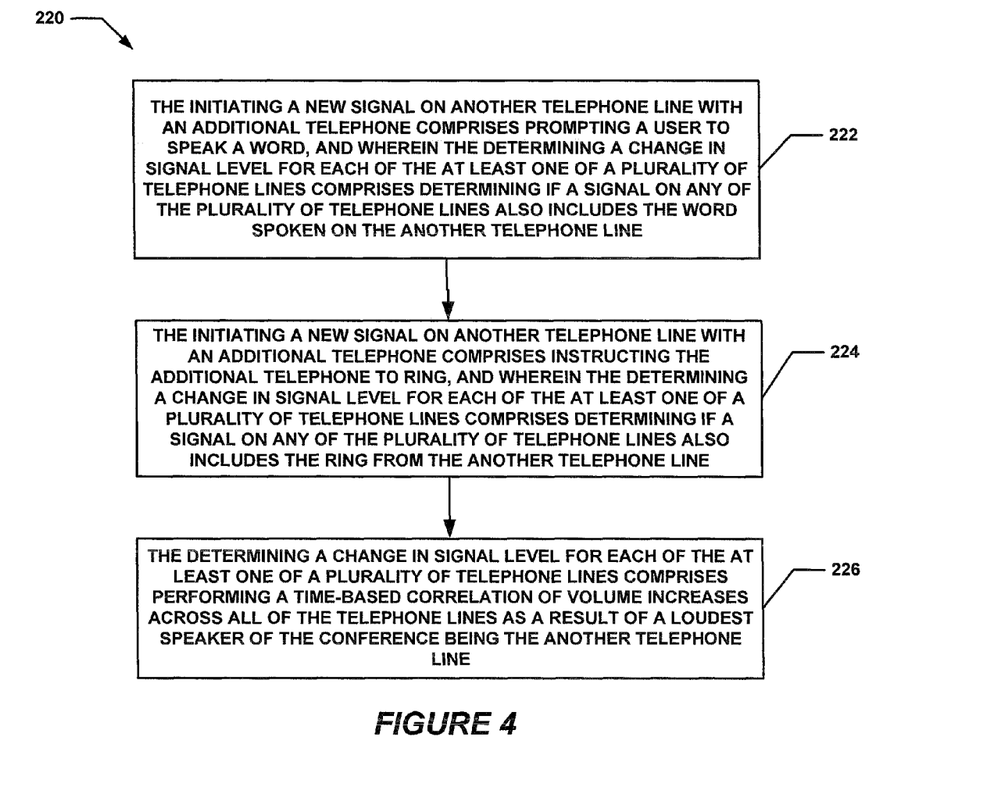
FIG. 4 comprises a flow diagram of particular ways of initiating a new signal and determining a change in signal level.

Referring now to FIG. 4, a flow diagram of particular methods 220 of initiating a new signal and determining a change in signal level as recited in processing blocks 204 and 206 is shown. Method 220 begins with processing block 222 which discloses the initiating a new signal on another telephone line with an additional telephone comprises prompting a user to speak a word, and wherein the determining a change in signal level for each of the at least one of a plurality of telephone lines comprises determining if a signal on any of the plurality of telephone lines also includes the word spoken on the another telephone line.

Processing block 224 states wherein the initiating a new signal on another telephone line with an additional telephone comprises instructing the additional telephone to ring, and wherein the determining a change in signal level for each of the at least one of a plurality of telephone lines comprises determining if a signal on any of the plurality of telephone lines also includes the ring from the another telephone line.

Processing block 226 recites wherein the determining a change in signal level for each of the at least one of a plurality of telephone lines comprises performing a time-based correlation of volume increases across all of the telephone lines as a result of a loudest speaker of the conference being the another telephone line.

Figure 5:
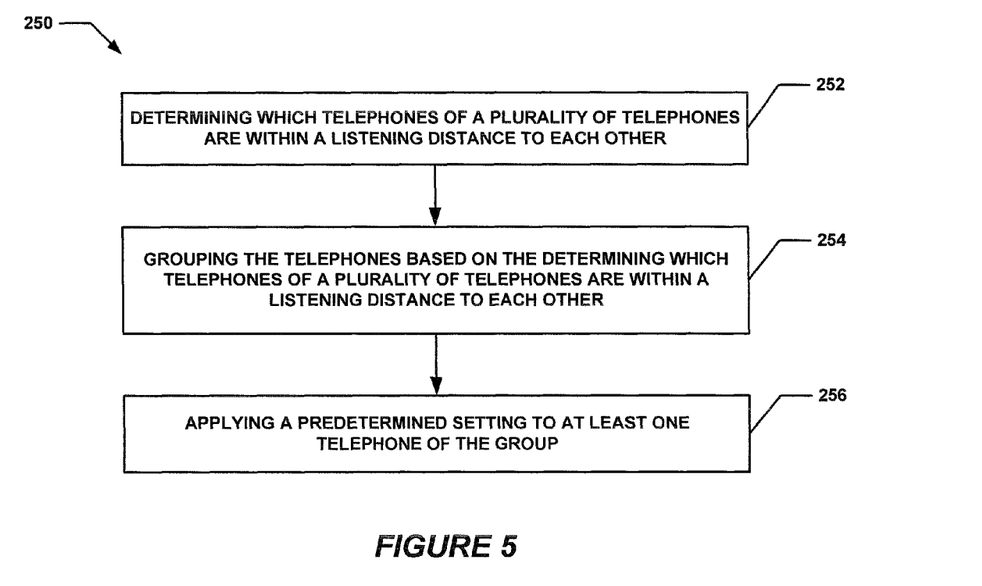
FIG. 5 comprises a flow diagram of a particular embodiment of a method for enhancing call quality of a conference call in accordance with embodiments of the invention.

Referring now to FIG. 5, a flow diagram of a particular embodiment of a method 250 for enhancing call quality of a conference call in accordance with embodiments of the invention is shown. Method 250 begins with processing block 252 that discloses determining which telephones of a plurality of telephones are within a listening distance to each other.

Processing block 254 states grouping the telephones based on the determining which telephones of a plurality of telephones are within a listening distance to each other. Processing block 256 recites applying a predetermined setting to at least one telephone of the group.

Figure 6:
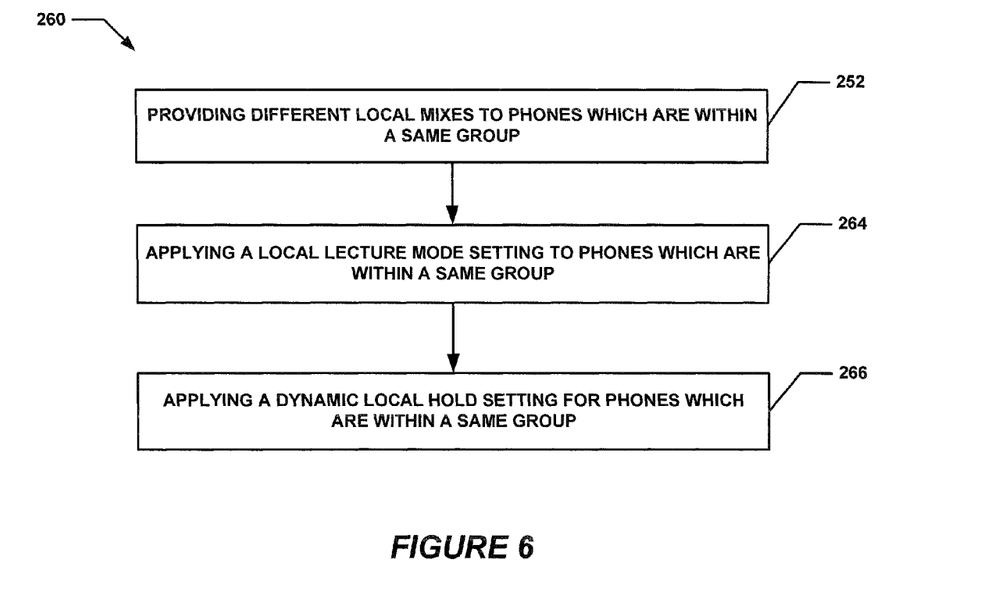
FIG. 6 comprises a flow diagram of particular ways of handling phones within a same group.

Referring now to FIG. 6, a flow diagram of a method 260 for applying a predetermined setting to at least one telephone of the group is shown. Method 260 begins with processing block 262 that discloses providing different local mixes to phones that are within a same group.

Processing block 264 states providing a local lecture mode setting to phones that are within a same group. Processing block 266 recites applying a dynamic local hold setting to phones that are within a same group.

Figure 7:
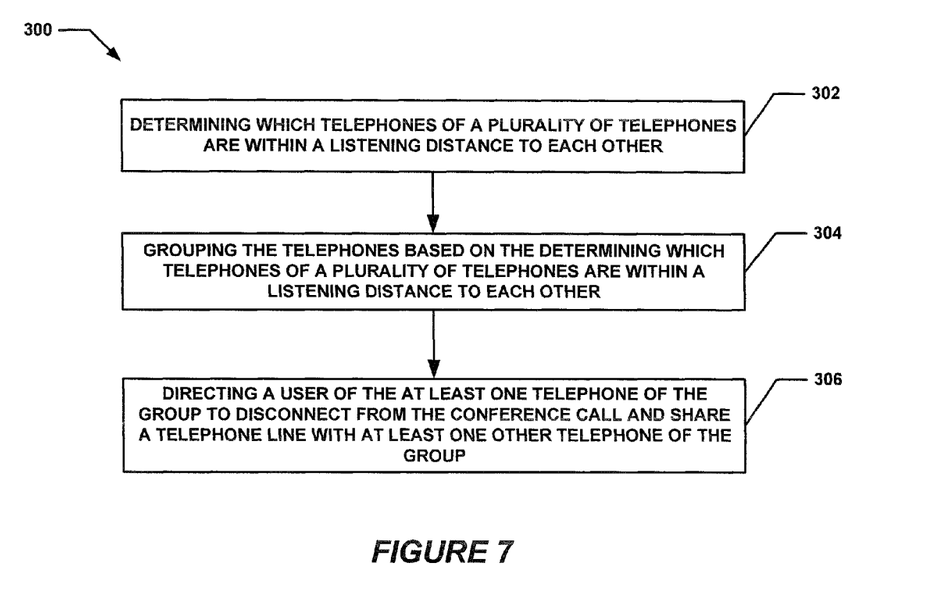
FIG. 7 comprises a flow diagram of a particular embodiment of a method for grouping conference call participants in accordance with embodiments of the invention.

Referring now to FIG. 7 a flow diagram of a particular embodiment of a method 300 for grouping conference call participants in accordance with embodiments of the invention is shown. Method 300 begins with processing block 302 that discloses determining which telephones of a plurality of telephones are within a listening distance to each other.

Processing block 304 states grouping the telephones based on the determining which telephones of a plurality of telephones are within a listening distance to each other. Processing block 306 recites directing a user of the at least one telephone of the group to disconnect from the conference call and share a telephone line with at least one other telephone of the group.

Figure 8:
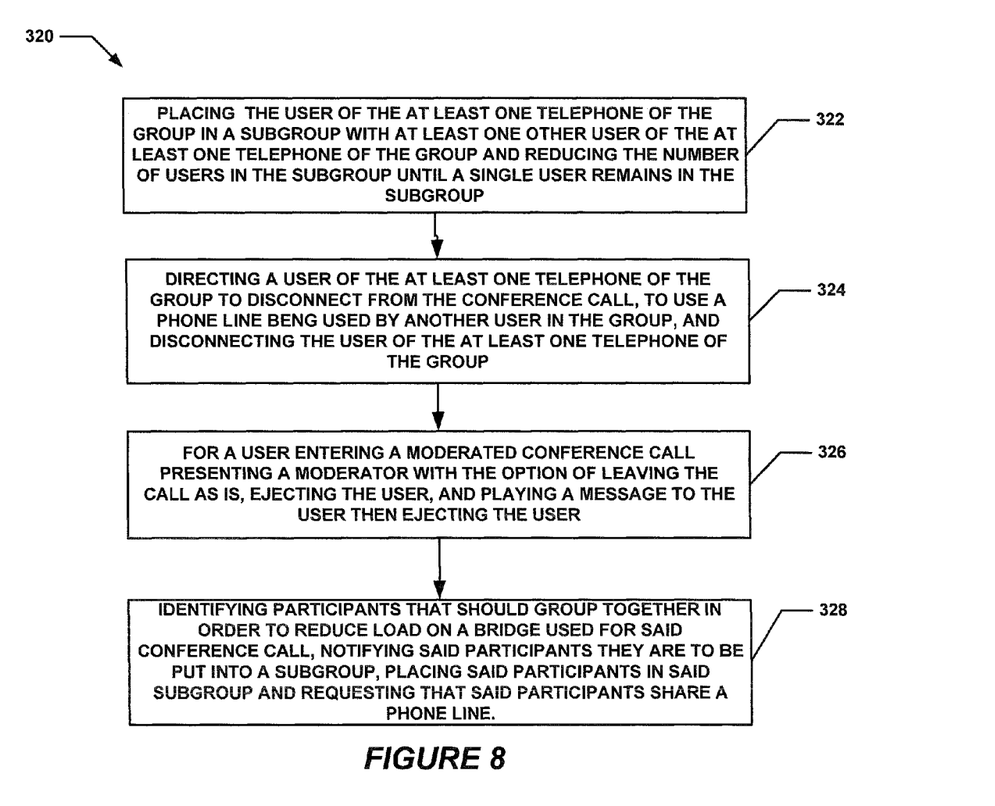
FIG. 8 comprises a flow diagram of particular ways of performing grouping of conference call participants.

Referring now to FIG. 8 a flow diagram of particular methods 320 directing a user of the at least one telephone of the group to disconnect from the conference call and share a telephone line with at least one other telephone of the group is shown. Method 320 begins with processing block 322 which discloses placing the user of the at least one telephone of the group in a subgroup with at least one other user of the at least one telephone of the group and reducing a number of the users in the subgroup until a single user remains in the subgroup.

Processing block 324 states directing a user of the at least one telephone of the group to disconnect from the conference call, to use a phone line being used by another user in the group, and disconnecting the user of the at least one telephone of the group. Processing block 326 recites for a user entering a moderated conference call presenting a moderator with the option of leaving the call as is, ejecting said user, and playing a message to the user then ejecting said user. Processing block 328 discloses identifying participants that should group together in order to reduce load on a bridge used for said conference call, notifying said participants they are to be put into a subgroup, placing said participants in said subgroup and requesting that said participants share a phone line.

Figure 9:
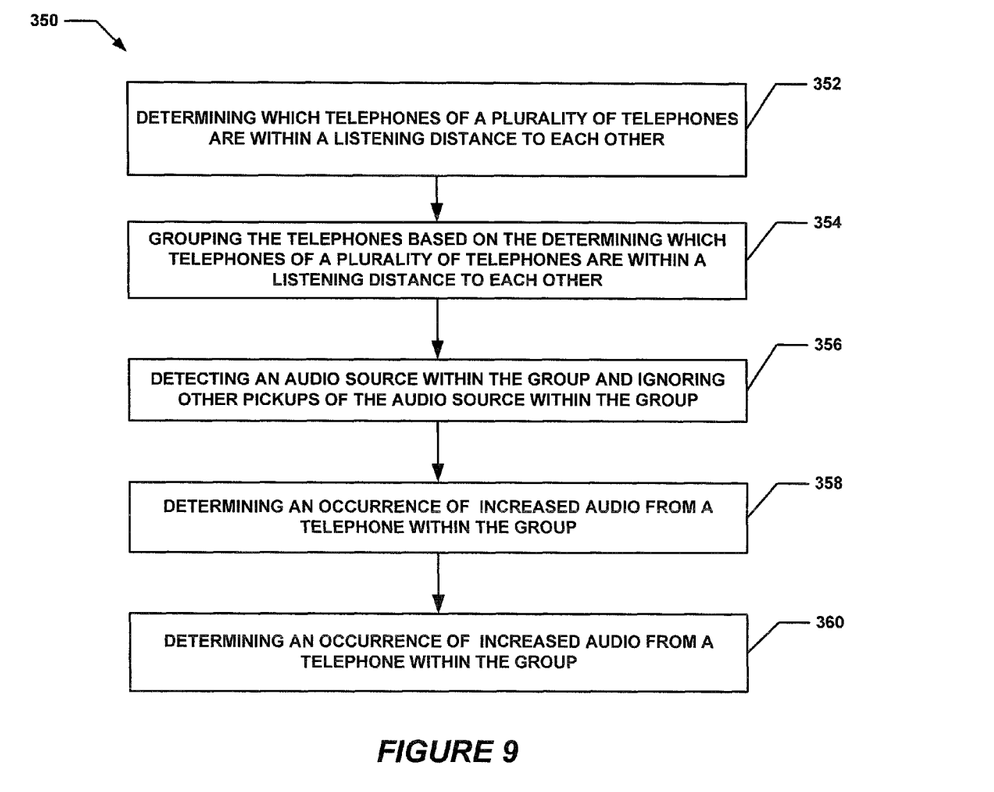
FIG. 9 comprises a flow diagram of a particular embodiment of a method for enhancing call quality of a conference call in accordance with embodiments of the invention.

Referring now to FIG. 9 a flow diagram of a particular embodiment of a method 350 for enhancing call quality of a conference call in accordance with embodiments of the invention is presented. Method 350 begins with processing block 352 which states determining which telephones of a plurality of telephones are within a listening distance to each other.

Processing block 354 recites grouping the telephones based on the determining which telephones of a plurality of telephones are within a listening distance to each other. Processing block 356 discloses detecting an audio source within said group and ignoring other pickups of said audio source within said group.

Processing block 358 states determining an occurrence of increased audio from a telephone within the group. Processing block 360 recites placing other telephones within the group on dynamic local hold.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method of enhancing call quality of a conference call comprising:
   determining which telephones of a plurality of telephones are within a listening distance to each other;
   grouping said telephones based on said determining which telephones of a plurality of telephones are within a listening distance to each other to form a group;
   identifying participants that should group together in order to reduce load on a bridge used for said conference call, notifying said participants they are to be put into a subgroup, placing said participants in said subgroup;
   applying a predetermined setting to at least one telephone of said group, wherein said applying a predetermined setting to at least one telephone of said group comprises providing different local mixes to phones that are within a same group, wherein said providing different local mixes comprises moving telephones from a current subgroup to different subgroups;
   directing a user of said at least one telephone of said group to disconnect from the conference call and share a telephone line with at least one other telephone of said group is selected from the group consisting of:
   a) placing said user of said at least one telephone of said group in a subgroup with at least one other user of said at least one telephone of said group and reducing a number of said users in said subgroup until a single user remains in said subgroup;
   b) directing a user of said at least one telephone of said group to disconnect from the conference call, to use a phone line being used by another user in said group, and disconnecting said user of said at least one telephone of said group;
   c) for a user entering a moderated conference call presenting a moderator with the option of leaving the call as is, ejecting said user, and playing a message to the user then ejecting said user; and
   d) identifying participants that should group together in order to reduce load on a bridge used for said conference call, notifying said participants they are to be put into a subgroup, placing said participants in said subgroup and requesting that said participants share a phone line.

2. A computer implemented method of enhancing call quality of a conference call comprising:
   determining which telephones of a plurality of telephones are within a listening distance to each other;
   grouping said telephones based on said determining which telephones of a plurality of telephones are within a listening distance to each other to form a group;
   detecting an audio source within said group and ignoring other pickups of said audio source within said group;
   determining an occurrence of increased audio from a telephone within said group; and
   applying a predetermined setting to at least one telephone of said group, wherein said applying a predetermined setting to at least one telephone of said group comprises providing dynamic local hold to phones that are within a same group, wherein said providing dynamic local hold comprises when phones are sufficiently close, the local group could be placed on hold while one of the phones in the local group is the active talker.

3. A non-transitory computer readable medium having computer readable code thereon for determining a telephone system topography, the medium comprising:
   instructions for determining which telephones of a plurality of telephones are within a listening distance to each other;
   instructions for grouping said telephones based on said determining which telephones of a plurality of telephones are within a listening distance to each other to form a group;
   identifying participants that should group together in order to reduce load on a bridge used for said conference call, notifying said participants they are to be put into a subgroup, placing said participants in said subgroup;
   instructions for applying a predetermined setting to at least one telephone of said group, wherein said applying a predetermined setting to at least one telephone of said group comprises providing different local mixes to phones that are within a same group, wherein said providing different local mixes comprises moving telephones from a current subgroup to different subgroups;
   directing a user of said at least one telephone of said group to disconnect from the conference call and share a telephone line with at least one other telephone of said group is selected from the group consisting of:
   a) placing said user of said at least one telephone of said group in a subgroup with at least one other user of said at least one telephone of said group and reducing a number of said users in said subgroup until a single user remains in said subgroup;
   b) directing a user of said at least one telephone of said group to disconnect from the conference call, to use a phone line being used by another user in said group, and disconnecting said user of said at least one telephone of said group;
   c) for a user entering a moderated conference call presenting a moderator with the option of leaving the call as is, ejecting said user, and playing a message to the user then ejecting said user; and
   d) identifying participants that should group together in order to reduce load on a bridge used for said conference call, notifying said participants they are to be put into a subgroup, placing said participants in said subgroup and requesting that said participants share a phone line.

4. A non-transitory computer readable medium having computer readable code thereon for enhancing call quality of a conference call comprising:
   instructions for determining which telephones of a plurality of telephones are within a listening distance to each other;

instructions for grouping said telephones based on said determining which telephones of a plurality of telephones are within a listening distance to each other to form a group;
instructions for detecting an audio source within said group and ignoring other pickups of said audio source within said group;
instructions for determining an occurrence of increased audio from a telephone within said group; and
instructions for placing other telephones within said group on dynamic local hold.

5. A computer system comprising:
a memory;
a processor;
a communications interface;
an interconnection mechanism coupling the memory, the processor and the communications interface; and
wherein the memory is encoded with an application enhancing call quality of a conference call, that when performed on the processor, provides a process for processing information, the process causing the computer system to perform the operations of:
determining which telephones of a plurality of telephones are within a listening distance to each other;
grouping said telephones based on said determining which telephones of a plurality of telephones are within a listening distance to each other to form a group;
identifying participants that should group together in order to reduce load on a bridge used for said conference call, notifying said participants they are to be put into a subgroup, placing said participants in said subgroup;
applying a predetermined setting to at least one telephone of said group, wherein said applying a predetermined setting to at least one telephone of said group comprises providing different local mixes to phones that are within a same group, wherein said providing different local mixes comprises moving telephones from a current subgroup to different subgroups;
directing a user of said at least one telephone of said group to disconnect from the conference call and share a telephone line with at least one other telephone of said group is selected from the group consisting of:
a) placing said user of said at least one telephone of said group in a subgroup with at least one other user of said at least one telephone of said group and reducing a number of said users in said subgroup until a single user remains in said subgroup;
b) directing a user of said at least one telephone of said group to disconnect from the conference call, to use a phone line being used by another user in said group, and disconnecting said user of said at least one telephone of said group;
c) for a user entering a moderated conference call presenting a moderator with the option of leaving the call as is, ejecting said user, and playing a message to the user then ejecting said user; and
d) identifying participants that should group together in order to reduce load on a bridge used for said conference call, notifying said participants they are to be put into a subgroup, placing said participants in said subgroup and requesting that said participants share a phone line.

6. A computer system comprising:
a memory;
a processor;
a communications interface;
an interconnection mechanism coupling the memory, the processor and the communications interface; and
wherein the memory is encoded with an application grouping conference call participants, that when performed on the processor, provides a process for processing information, the process causing the computer system to perform the operations of:
determining which telephones of a plurality of telephones are within a listening distance to each other;
grouping said telephones based on said determining which telephones of a plurality of telephones are within a listening distance to each other to form a group; and
directing a user of said at least one telephone of said group to disconnect from the conference call and share a telephone line with at least one other telephone of said group.

7. A computer system comprising:
a memory;
a processor;
a communications interface;
an interconnection mechanism coupling the memory, the processor and the communications interface; and
wherein the memory is encoded with an application enhancing call quality of a conference call, that when performed on the processor, provides a process for processing information, the process causing the computer system to perform the operations of:
determining which telephones of a plurality of telephones are within a listening distance to each other;
grouping said telephones based on said determining which telephones of a plurality of telephones are within a listening distance to each other to form a group;
detecting an audio source within said group and ignoring other pickups of said audio source within said group;
determining an occurrence of increased audio from a telephone within said group; and
placing other telephones within said group on dynamic local hold.

8. The method of claim 1 wherein said providing a local lecture mode comprises placing a first telephone in a current subgroup on speaker and placing remaining telephones of said subgroup on hold.

9. The method of claim 1 wherein said providing a applying a dynamic local hold comprises a first telephone in a current subgroup being active and placing remaining telephones of said subgroup on hold.

10. The non-transitory computer readable medium of claim 3 wherein said providing a local lecture mode comprises placing a first telephone in a current subgroup on speaker and placing remaining telephones of said subgroup on hold.

11. The non-transitory computer readable medium of claim 3 wherein said providing a applying a dynamic local hold comprises a first telephone in a current subgroup being active and placing remaining telephones of said subgroup on hold.

12. The computer system of claim 5 wherein said providing a local lecture mode comprises placing a first telephone in a current subgroup on speaker and placing remaining telephones of said subgroup on hold.

13. The computer system of claim 5 wherein said providing a applying a dynamic local hold comprises a first telephone in a current subgroup being active and placing remaining telephones of said subgroup on hold.

14. The method of claim 1, wherein said applying a predetermined setting to at least one telephone of said group comprises at least one of providing a local lecture mode setting to phones which are within a same group, and applying a dynamic local hold setting to phones that are within a same group.

15. The non-transitory computer readable medium of claim 3, wherein said applying a predetermined setting to at least one telephone of said group comprises at least one of providing a local lecture mode setting to phones which are within a same group, and applying a dynamic local hold setting to phones that are within a same group.

16. The computer system of claim 5 further wherein said applying a predetermined setting to at least one telephone of said group comprises at least one of providing a local lecture mode setting to phones which are within a same group, and applying a dynamic local hold setting to phones that are within a same group.

* * * * *